R. E. KELLOGG.
HORN SIGNALING DEVICE.
APPLICATION FILED AUG. 1, 1911.

1,049,731.

Patented Jan. 7, 1913.

Witnesses.

Inventor.
Ray E. Kellogg.
Attys.

UNITED STATES PATENT OFFICE.

RAY E. KELLOGG, OF LOS ANGELES, CALIFORNIA, ASSIGNOR OF ONE-HALF TO CARY W. CRAWFORD, OF LOS ANGELES, CALIFORNIA.

HORN SIGNALING DEVICE.

1,049,731.  Specification of Letters Patent.  Patented Jan. 7, 1913.

Application filed August 1, 1911. Serial No. 641,758.

*To all whom it may concern:*

Be it known that I, RAY E. KELLOGG, a citizen of the United States, residing at Los Angeles, in the county of Los Angeles and State of California, have invented new and useful Improvements in Horn Signaling Devices, of which the following is a specification.

This invention relates to improvements in signaling devices and particularly to horns for automobiles or other vehicles.

It is an object of the invention to provide such a signal or horn which is capable of adjustment for producing a variety of tones and of blending a plurality of tones to produce a given or desired result.

Figure 1:
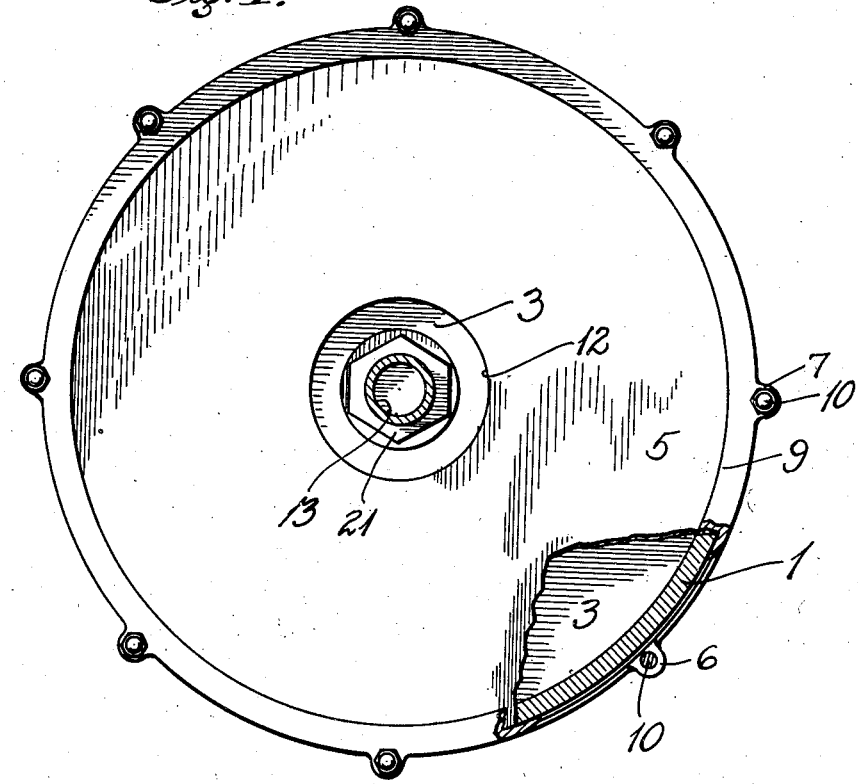
Figure 2:
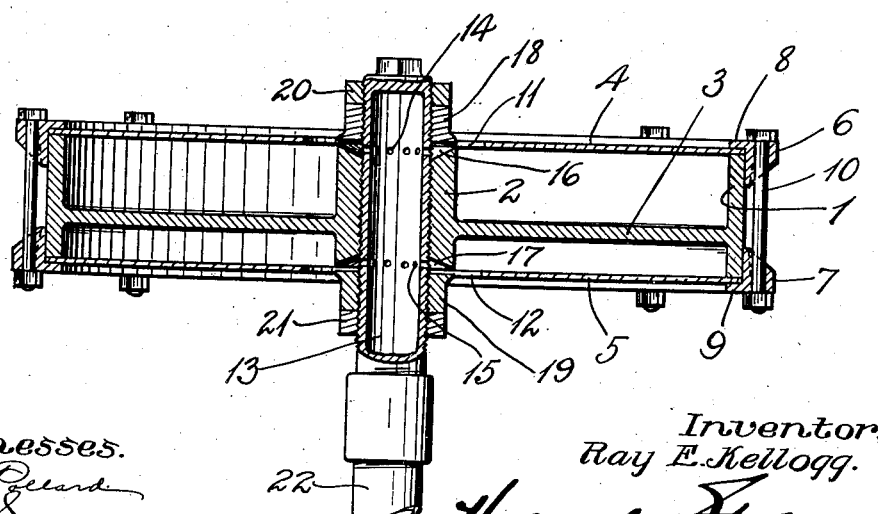

In the accompanying drawing forming a part of this specification, Figure 1 is a side elevation of a horn signaling device constructed in accordance with the present invention. Fig. 2 is a transverse sectional view through the central portion thereof.

The details of the invention will now be more particularly described, reference being had to the said drawing in which 1 indicates a drum which is preferably of metal and is provided with a hub 2 and a connecting web portion 3. The web portion 3 is preferably located nearer one end of the hub than the other so as to form a larger compartment upon one side of said web than upon the other as shown in Fig. 2.

Fitting upon the ends of the drum are diaphragms 4 and 5 which are adapted to be held in place upon the drum by means of rings 6 and 7. The said rings also fit upon the outer periphery of the drum 1 and their inwardly projecting flanges 8 and 9 overhang the edges of the diaphragms 4 and 5 sufficiently to firmly hold them in place upon the edges of the drum. The rings 6 and 7 are perforated at intervals and are connected by securing bolts 10 by which they may be drawn toward each other and caused to firmly hold the said diaphragms in place. The diaphragms are formed with central openings 11 and 12 which are somewhat larger in diameter than the hub 2. The hub 2 is fastened upon a hollow cylinder or stem 13, the said stem being preferably screw threaded upon its outer periphery as shown in Fig. 2 while the hub is internally threaded so as to be readily secured thereon. The stem 13 is perforated at 14 and 15, a series of perforations being employed, arranged circumferentially of the stem 13 in a plane approximately opposite the edges of the said hub 2. The said edges of the hub are usually beveled inwardly as shown at 16 and 17 so as to form recesses opposite the apertures 14 and 15.

Adjustable rings 18 and 19 are also threaded upon the stem 13 and are adjusted quite close to the edges of the hub 2 so as to form openings for air to escape of a suitable size to properly act upon the adjacent inner edges of the diaphragms in producing sounds or signals. Lock rings 20 and 21 are also secured upon the stem 13 so that after the rings 18 and 19 have been adjusted they may be locked in position.

The stem 13 is adapted to be coupled with a tube or pipe 22 so that air may be forced into the said stem and outwardly through the apertures 14 and 15 to produce the signal sounds. The air escaping between the edges of the rings 18 and 19 and the hub 2 will impinge upon the edges of the diaphragms 4 and 5 so as to produce whistling or other like sounds.

It will be understood that the sounds may be varied not only by the adjustment of the rings 18 and 19 with respect to the edges of the hub but also by the thickness of the diaphragms 4 and 5 as well as by the size of the central openings therein 11 and 12. The character of the sound produced may also be further varied by the size of the openings or chambers formed upon each side of the web 3. The relative size of the chambers upon opposite sides of the said web 3 will also produce a difference in the blending of the sounds so that any pleasing or other sound may be accomplished as found desirable.

What I claim is:—

1. A signal device, comprising a drum having apertured heads, a partition within the drum dividing the space between the said heads into separate compartments, and means for forcing a fluid against the edges of said apertures.

2. A signal device comprising a drum having heads formed with sound producing apertures, the drum being provided with separate chambers of different depths arranged behind each of said heads, and means mounted upon said drum for delivering air or other fluids under pressure against the edges of said apertures.

3. A signaling device comprising a drum having a perforated hub structure adapted to direct air under pressure, the said drum carrying sounding portions adapted to be affected by the air expelled from the said hub.

4. A signal device, comprising a drum mounted on a hollow perforated hub having a partition dividing the drum into compartments of different sizes, each compartment having sound outlet openings, and means for forcing a fluid through the perforations in said hub against the edges of said sound outlet openings.

5. A signal device comprising a drum having a web portion dividing the drum into different sized compartments, a perforated hub portion within said drum, adapted to deliver air or other materials under pressure at the center of the drum, the heads having openings opposite the air outlets whereby sounds are produced.

6. A signal device comprising a drum having a hub portion, a stem inserted in said hub and having outlet passages formed opposite the edges of the hub for delivering air or other materials from the said stem, adjustable members mounted upon said stem, and controlling the passage of air from the perforations, the drum heads having central openings surrounding the air outlets, and rings for binding the said heads to the said drum.

In witness that I claim the foregoing I have hereunto subscribed my name this 25th day of July, 1911.

RAY E. KELLOGG.

Witnesses:
CASSELL SEVERANCE,
E. STADLMAN.